United States Patent [19]

Gericke

[11] Patent Number: 5,230,018
[45] Date of Patent: Jul. 20, 1993

[54] COMMUNICATION SYSTEM FOR ACTIVATING AN OPTICAL DISPLAY IN A COMMUNICATION TERMINAL OF A COMMUNICATION SWITCHING STATION

[75] Inventor: Harald Gericke, Oberhausen, Fed. Rep. of Germany

[73] Assignee: Siemens Aktiengesellschaft, Munich, Fed. Rep. of Germany

[21] Appl. No.: 581,375

[22] Filed: Sep. 12, 1990

[30] Foreign Application Priority Data

Sep. 29, 1989 [DE] Fed. Rep. of Germany ....... 3932684

[51] Int. Cl.⁵ ............................................ H04M 1/00
[52] U.S. Cl. ................................. 379/373; 379/376; 379/372; 379/396
[58] Field of Search ............... 379/372, 373, 376, 396, 379/387, 441, 442

[56] References Cited

U.S. PATENT DOCUMENTS

| | | | |
|---|---|---|---|
| 4,266,101 | 5/1981 | Dunbar | 379/376 |
| 4,794,638 | 12/1988 | Millet | 379/376 |
| 4,821,314 | 4/1989 | Guyader et al. | 379/376 |

Primary Examiner—James L. Dwyer
Assistant Examiner—M. Shehata
Attorney, Agent, or Firm—Hill, Steadman & Simpson

[57] ABSTRACT

A central clock unit has a ring generator for generating ringing signals and a DC voltage source for generating display signals. With the assistance of the central clock unit having a switching unit that is controlled by a central processor unit, either the ringing signals or display signals are transmitted to an analog communication terminal via a ring down line and a line connection unit. Within the line connection unit, a switch is controlled by a ringing-display procedure to generate the desired rhythm of the ringing or display signal. A read/write memory unit within an I/O device is divided into dedicated memory sections to eliminate any delays associated with the control of the ringing-display procedure. The dedicated memory sections are used to store information which is written to or read from the memory by the I/O device and the central processor unit.

19 Claims, 1 Drawing Sheet

COMMUNICATION SYSTEM FOR ACTIVATING AN OPTICAL DISPLAY IN A COMMUNICATION TERMINAL OF A COMMUNICATION SWITCHING STATION

BACKGROUND OF THE INVENTION

Field of the Invention

The present invention relates to a communication system for activating an optical display that is located at a communication terminal.

Description of the Related Art

Communication terminals, particularly analog telephone terminals, are connected to digital communication switching stations by analog line interfacing. As is standard in analog subscriber lines, the analog speech, dial, and ring signals are transmitted by two symmetrical, twisted copper lines. These lines carry such signals from or respectively to the communication terminal. Low frequency AC signals (ring signals) are provided to activate the acoustical calling/ringing unit in the communication terminals. These AC ring signals are generated in digital, program-controlled communication switching stations (i.e., a central ringing generator device) and are sent to line connection units along ring down lines.

The line connection unit provides the necessary interface to the analog communication terminals. The line connection unit switches the ringing signals to the wires of the lines connected to the communication terminal through the use of a relay or other switching means. Various ringing rhythms (i.e., internal ringing, external ringing, etc.) can be implemented by varying the time period in which the ringing signals are switched to the connecting lines. The switching means within the line connection unit are controlled by ringing procedures that are implemented in the communication switching station to achieve the various ringing rhythms. One of the ringing procedures (or "tasks") is implemented partially in an input/output device (I/O device) and partially in the associated line connection unit.

The I/O devices are utilized for easing the dynamic burden that is placed on a central processor unit. These I/O devices communicate with the line connection unit with the assistance of data transmission procedures implemented in both units, for example, with the assistance of a High-Data-Link-Control (HDLC) program. The I/O devices exchange information with the central processor unit via a read/write (R/W) memory unit. Among those skilled in the art, the R/W memory unit is also known as a "dual port RAM interface". Information from the I/O devices as well as from the central processor unit can be written to and read from the R/W memory unit. Within the R/W memory unit, certain memory sections are reserved for messages that are to be exchanged between the I/O devices and the central processor unit. These sections are continuously read by both the I/O device and the central processor unit. When the dynamic load oh the communication switching station is heavy, information queues develop resulting from a delayed read out of the messages. Consequently, time delays that inhibit the transmission of time-critical information via the R/W memory also develop.

A communication switching station such as has been described above is suggested in the German patent application P38 23 914.0.

In order to implement new features, optical displays (e.g. glow-discharge lamps) are employed in addition to the acoustical or optical outputs for the ringing signals. "Message waiting", for example, is one such new feature. The "message waiting" feature indicates, after the end of a current connection, that another connection set up to the communication terminal was attempted during the preceding connection. The indication that this occurred is provided by an additional optical display at the analog communication terminal. The subsequent actuation of a corresponding input means in the analog communication terminal is used to cause the communication switching system to automatically set up a connection to the communication terminal that attempted to initialize the other connection set up during the preceding connection.

It is an object of the present invention to enhance a communication system, such as was described above, so that an optical display means within a communication terminal can be activated for the implementation of additional features with a limited modification of the known communication system structures.

SUMMARY OF THE INVENTION

A communication system is disclosed for the activation of an optical display that is located in a communication terminal of a communication switching station. Within the communication switching station there is a central clock unit having a ring tone generator and further having a D/C voltage source. A change over switch within the central clock unit is under the control of a central processor unit and is used to place a ring signal or a D/C voltage on a ring down line. The ring down line proceeds from the central clock unit and is supplied to a line connection unit.

The central idea of the invention is that the display signals, like the ringing signals, are generated in a clock pulse generator unit (central clock unit) and are both transmitted to the line connection unit via the ring down line. The display signals are transmitted along the ring down line in an alternating fashion with the ringing signals.

To implement the invention an additional interface ensuring short transmission times is necessary. This is due to the fact that the alternating transmission of the ringing and display signals is time critical. To achieve such short transmission times, a separate dedicated memory section is arranged in the R/W memory installation. The separate dedicated memory section is used to store initialization information bits (usually comprising a few bits written from the central processor unit). The initialization information bits indicate whether ringing signals or display signals are currently being transmitted along the ring down line. The separate dedicated memory section is cyclically polled through the use of an interrupt procedure to determine the state of the initialization information bits are present (i.e., to determine whether ringing or display signals are present at the ring down line).

Upon the detection of a change in the initialization information bits within the separate dedicated memory section, the switching means in the line connection unit is controlled in accordance with a ring-display program. The ring-display program is implemented with the assistance of the I/O device and the corresponding line connection unit.

The ring-display program evaluates all requests for the transmission of ringing signals or display signals. These requests are transmitted by the switching programs running in the communication switching station. The requests are evaluated for the respective communication terminal and the corresponding events, for example, controlling the switching means in the line connecting equipment, are controlled. After all of the instructions from the switching programs have been processed, end information bits are generated by the ring-display program and written into another separate dedicated memory section of the appertaining R/W memory unit. These further separate dedicated memory sections are scanned in a cyclic fashion by the central processor unit by virtue of an interrupt procedure. If end information bits are present in all of the further separate dedicated memory sections of all of the R/W memory units of all of the I/O units, initialization information bits are again generated in the central processor unit and written into the separate dedicated memory section.

A significant advantage can be achieved by implementing a communication system in accordance with the present invention. By adding a single additional DC voltage source, one additional switching means, and a "fast" interface between the I/O devices and the central processor unit, further optical display features can be added. These further display features may be added to an already existing communication system without significant modifications thereof.

In an advantageous embodiment of the invention, the added switching means may be realized by relays or by switching logic comprising integrated circuits. Switching logic circuits using integrated technology usually utilize tri-stated outputs that facilitate the implementation of relay-type functions.

The optical display utilized at the communication terminal can be realized in a particularly advantageous manner by a glow-discharge lamp. This glow-discharge lamp is placed in parallel with a serially arranged capacitor/bell circuit. By placing the glow-discharge lamp in parallel with the capacitor/bell circuit, it becomes possible to drive the capacitor/bell circuit and the glow-discharge lamp separately. However, in order for this to occur, the voltage of the ringing signals must be less than the ignition voltage of the glow-discharge lamp. Thus, ringing signal voltages lying below the ignition voltage of the glow-discharge lamp activate, via the capacitor, the bell, while leaving the glow-discharge lamp inactive. The display signals have a DC voltage above the ignition voltage of the glow-discharge lamp. Consequently, if these display signals reach the communication terminal, the glow-discharge lamp is activated while the bell remains unaffected since the DC display signals are blocked by the capacitor.

BRIEF DESCRIPTION OF THE DRAWING

Other objects and advantages of the present invention will become apparent upon reference to the accompanying description when taken in conjunction with FIG. 1 which is a schematic representation of a communication system embodying the principles of the present invention.

DETAILED DESCRIPTION OF THE PRESENTLY PREFERRED EMBODIMENT

Figure 1:
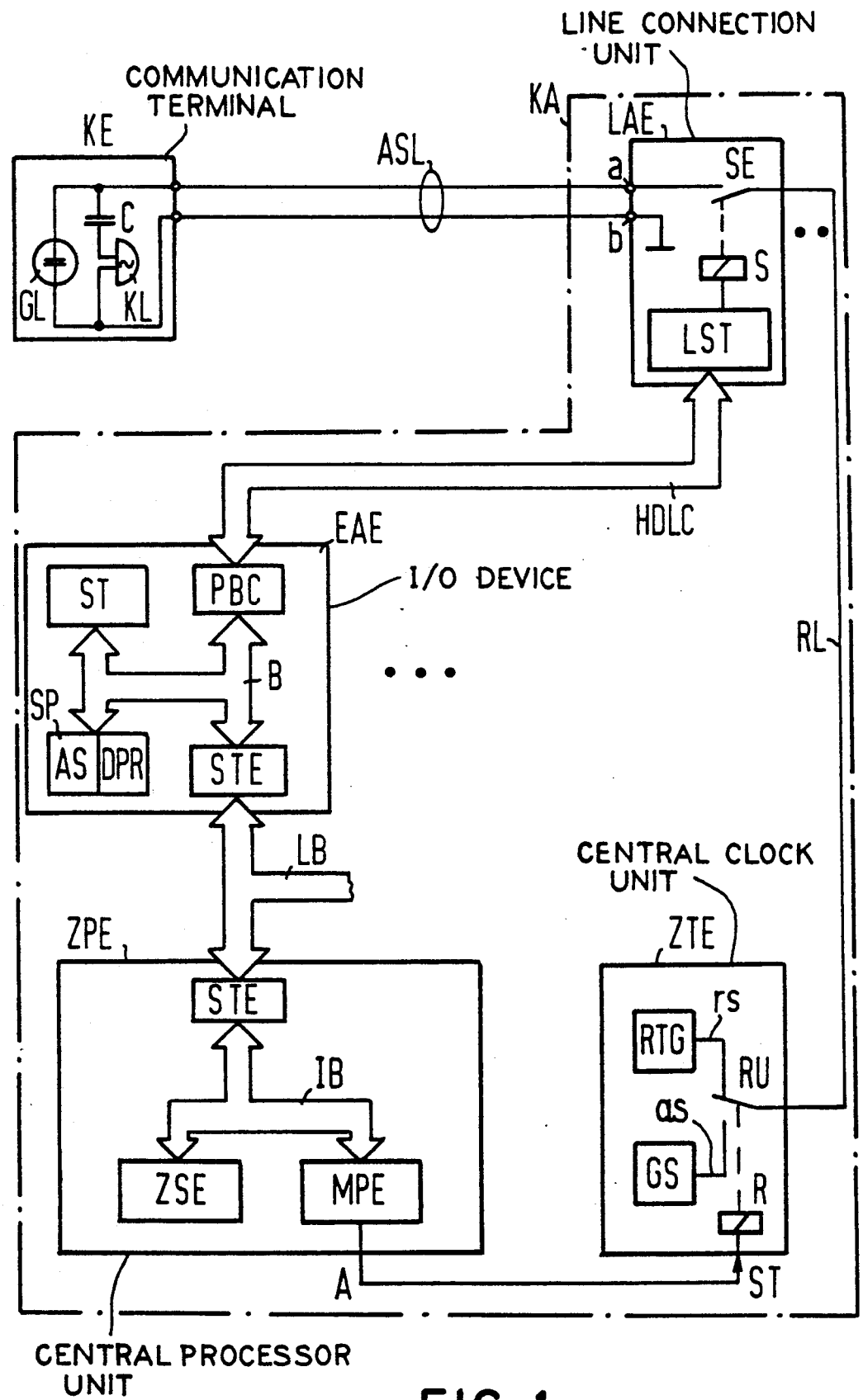

FIG. 1 shows a communication system embodying the present invention. The communication system is generally comprised of a communication terminal KE and a communication station KA. The communication station is shown as having a central processor unit ZPE that comprises a central memory unit ZSE, a microprocessor unit MPE and an interface device STE. The microprocessor unit MPE may be implemented around an Intel 80286 microprocessor. An internal bus IB comprising address, data and control lines is connected to a local bus LB by the interface device STE. The local bus LB likewise comprises data, address and control lines. The central memory unit ZSE, generally stated, is used to store the database and constitutes the main memory for the microprocessor unit MPE. The microprocessor unit MPE performs several functions, including the switching-oriented and safety-related control functions of the communication switching station KA.

An output A of the microprocessor unit MPE is connected to a control input ST of a central clock device ZTE. The control input ST of the central clock device ZTE is connected to a relay R. The relay R allows the microprocessor unit MPE to control the change-over switch RU. One of the switch-over contacts of the change-over switch RU is connected to a ring tone generator RTG. A DC supply GS is connected to the other switch-over contact of the change-over switch RU. The ring tone generator RTG is used to generate AC ringing signals rs. These signals, for example, may have a frequency of 16 2/3, 20 and 25 Hz and an AC voltage of 60 volts. The DC supply GS may be implemented, for example, by a current supply with a voltage potential of 130 VDC. This 130 VDC voltage constitutes the display signal as.

The central contact of the change-over switch RU is connected to a ring down line RL. The ring down line RL connects the central contact of the change-over switch RU to a switching element SE arranged in a line connection unit LAE. Although the switching element SE is shown as a relay, tri-state integrated logic circuits can also be used to implement the relay functions. The relay S is controlled by a line control circuit LST that coordinates and controls the events within the line connection unit LAE. The other contact of the switching elements SE is connected to a wire (e.g. the A-wire) of a two conductor connecting line ASL. The other wire of the connecting line ASL is tied to ground.

The connecting lines ASL, usually realized by symmetrical, twisted copper lines, are connected to a respective communication terminal. The communication terminal is typically at a location that is remote from the communication switching station KA. The exemplary embodiment of FIG. 1 shows only those components of the communication terminal KE that are necessary for a proper description of the present invention.

A conventional connection of a capacitor C and a bell unit KL is provided for the acoustical output of the ringing signal rs. The capacitor C and bell unit KL are connected in a serial arrangement. One end of the capacitor C is connected to the A-wire of the connecting line ASL while the B-wire of the connecting line ASL is connected to the bell unit KL. A glow-discharge lamp GL is placed in parallel with the serial connection of the capacitor C and the bell unit KLE. For the purposes of the exemplary embodiment, it will be assumed that the glow-discharge lamp GL has an ignition voltage of 110 VDC.

A line control unit LST within the line connection unit LAE is connected to the I/O device EAE. The connection between the units may be implemented as a single line that is used to exchange information or data between the line control unit LST and the I/O device EAE. A High-Data-Link-Control (HDLC) program is used to control the information and data transmission. A protocol control unit PBC is utilized in the line control unit LST to implement the HDLC program. Although it is not shown in the drawing, a protocol control unit is also employed in the line control unit LST. Since the use of HDLC programs for the exchange of data, commands and messages is quite popular, the interface between the line connection unit and the I/O device may be implemented using conventional transmission components and integrated circuits. As such, it is unnecessary to modify the hardware or software for the employment of this type of interface in the communication switching station of the INVENTION.

The I/O device EAE comprises a control unit ST and a memory storage unit SP. The memory storage unit SP is divided into a memory section AS that is allocated to the control unit ST and into a R/W memory unit DPR. The I/O unit EAE is also connected to the local bus LB by an interface unit STE. All of the units PBC, ST, SP and STE are connected to one another by an internal data bus B comprising address, data and control lines.

The figure shows only those portions of the communication system necessary to describe the invention. However, other components may also be added The local bus LB can, for example, connect four I/O devices EAE to the central processor unit ZPE. In turn, eight line connection units LAE can be coupled to the I/O devices EAE. Additionally, for example, sixteen analog communication terminals KE can be connected by connecting lines ASL to a single lien connection unit LAE.

In the exemplary embodiment, the central processor unit ZPE controls the changeover switch RU. It will be assumed that the ringing signal RS is initially connected to the switching unit SE via the ring down line RL. At the beginning of this switch over, initialization information bits are generated by the central processor unit ZPE and transmitted to a separate dedicated memory section of the R/W unit DPR. This transmission takes place via the interface units STE and the local bus LB. These initialization information bits indicate that ringing signals RS are currently being transmitted via the ring down line RL.

The separate dedicated memory section is scanned in a cyclic fashion by virtue of an interrupt procedure implemented in the control unit. After the control unit ST has determined the status of the initialization information bits, a ringing-display procedure is implemented by the control unit ST of the I/O device and the line control unit LST of the line connection unit LAE. The ringing-display procedure is used to control the relay S to activate the switching element SE so that the desired ringing signals rs are transmitted with the required ringing rhythm along the connecting lines ASL.

After processing all of the instructions for the ringing-display program, end information bits are generated by the ringing-display procedure and written into a further dedicated memory section of the R/W memory DPR. This further dedicated memory section is scanned in a cyclic fashion by an interrupt procedure implemented in the central processor unit ZPE and the presence of end information bits are registered in the memory of the central processor unit ZPE. If end information bits are detected in all of the I/O devices that are connected to the central processor unit ZPE, initialization information bits are generated by the central processor unit ZPE that indicate that the display signals as are being transmitted via the ring down line RL. At the same time, the change over switch RU is controlled via the output A of the central processor unit ZPE. The interrupt procedure implemented by the control unit ST detects the new initialization information bits within the dedicated memory section of the R/W memory DPR and the ringing-display procedure is started. With this ringing-display procedure, the display signals are transmitted to the respective communication terminals via the switching element SE and the connecting lines ASL. The display signals as, being 130 VDC, ignite the glow-discharge lamps GL in the respective communication terminal KE. These glow-discharge lamps GL remain lit as long as the display signals as are switched to the connecting lines ASL by the change over switch RU via the ring down line RL and the switching elements SE.

Although changes and modifications of the invention may be suggested by those skilled in the art, it is the intention of the inventor to embody within the patent warranted hereon all such changes and modifications as reasonably and properly come within the scope of his contribution to the art.

I claim:

1. A communication system having a communication station, the communication system consisting of:
    a communication terminal having an optical display;
    a central processor means for performing transmission-related and safety oriented control and coordination of the communication station;
    a central clock unit having a ring tone generator, a dc voltage source and a switch means, the central clock unit being connected to a receive a control signal from the central processor means, the control signal being used to switch the switch means to through-connect either a ringing signal from the ring tone generator or a dc voltage from the dc voltage source to a ring down line that is output from the central clock unit;
    a line connection means connecting to the ringdown line for through-connecting a signal on the ring down line to the communication terminal via a further switch means and analog lines connected to the communication terminal; and
    an I/O device having a R/W memory, the R/W memory having a first dedicated memory section connected to receive initialization bits from the central processor means and a second dedicated memory section connected to store end information bits generated by the I/O device, the I/O device including means for cyclically scanning the first dedicated memory section to detect the initialization bits, the I/O device and the line connection unit being connected to control through-connection of the signal on the ring down line via the further switch means to the communication terminal in accordance with a ringing-display program that is executed upon detection of the initialization bits, the I/O device including means for storing the end information bits in the second dedicated memory section upon completion of the ringing-display program, the central processor means including further means for cyclically scanning the second dedicated memory section and for storing further initialization bits upon detection of the end information bits.

2. A communication system as recited in claim 1, wherein the information bits indicate which of the ringing signal or the dc voltage is connected to the ring down line.

3. A communication system as recited in claim 1, wherein the switch means is a relay.

4. A communication system as recited in claim 1, wherein the further switch means is a relay.

5. A communication system as recited in claim 1, wherein the switch means is a logic circuit.

6. A communication system as recited in claim 1, wherein the further switch means is a logic circuit.

7. A communication terminal as recited in claim 1, wherein the optical display comprises a glow lamp and wherein the glow lamp is connected in parallel with a series connected capacitor and bell.

8. A communication terminal as recited in claim 7, wherein the glow lamp is activated by a first voltage level and the series connected capacitor and bell are activated by a second voltage level, the first voltage level being greater than the second voltage level.

9. A communication system for activating an optical display in a communications terminal consisting of:
a switch means for switching either a ringing signal or a display signal to a ring down line;
central processing means for controlling the switch means and for generating initialization information bits indicative of whether ringing signals or display signals are switched to the ring down line;
memory means for storing the initialization bits in a dedicated memory section thereof;
scanning means for cyclically scanning the initialization bits stored in the dedicated memory section and for through-connecting at the ring down line to the communications terminal in accordance with a ringing-display program that is executed upon detection of the initialization information bits; and
means for writing end information bits into a further dedicated memory section of the memory means after the scanning means has completed processing the ringing-display program, the central processing means further including means for scanning the further dedicated memory section and for storing further initialization bits upon detection of the end information bits.

10. A communication system for activating an optical display in a communications terminal as recited in claim 9, wherein the switch means comprises:
a ring-tone generator having an output as the ringing signal;
a DC supply having an output as the display signal;
relay means, connected to the ring-tone generator and the DC supply, for through-connecting either the ringing signal or the display signal to the ring down line, the relay means being controllable by the central processing unit.

11. A communication system for activating an optical display in a communications terminal as recited in claim 9, wherein the central processing means comprises:
a microprocessor unit;
a central memory unit;
an interface unit;
an internal data bus connecting the microprocessor unit, the central memory unit and the interface unit to one another, the interface unit providing means for connecting the central processing means to a local bus.

12. A communication system for activating an optical display in a communications terminal as recited in claim 9, wherein the scanning means comprises:
an I/O device having the memory means; and
a line connection unit connected to the I/O device, the ring-down line and the communications terminal, the line connection unit having a relay connected to the ring-down line and the communications terminal, the relay means controlled by the ringing-display procedure to through-connect the ring-down line to the communications terminal.

13. A communication system for activating an optical display in a communications terminal as recited in claim 12, wherein the I/O device and the line connection unit communicate with one another in accordance with a high-data-link-control (HDLC) program.

14. A communication system for activating an optical display in a communications terminal as recited in claim 9, wherein the means for writing comprises an I/O device having the memory means.

15. A communication system consisting of:
a central processor having a control output signal;
a means for switching either a ringing signal or a display signal to a ring down line in response to the control output signal of the central processor;
an I/O device connected to the central processor by a local bus; and
a line connection unit connected to receive the ring down line from the means for switching and further connected to communicate by means of a high-data-link-control (HDLC) program with the I/O device.

16. A communication system as recited in claim 15, wherein the I/O device comprises a memory having dedicated memory sections that are accessible to the central processor for storing initialization information bits.

17. A communication system as recited in claim 15, further comprising a communication terminal connected to the line connection unit, the line connection unit having a switching element provided for switching signals received from the ring down line to the communication terminal in accordance with a ringing-display program.

18. A communication system as recited in claim 17, wherein the communication terminal comprises:
a bell;
a capacitor placed in series with the bell to form a series bell/capacitor unit; and
a glow discharge lamp connected in parallel with the series bell/capacitor unit, the glow discharge lamp and the series bell/capacitor unit receiving the signals that are switched by the switching element.

19. A communication terminal as recited in claim 15, wherein the means for switching comprises:
a ring-tone generator having an output as the ringing signal;
a DC supply having an output as the display signal;
relay means, connected to the ring-tone generator and the DC voltage generator, for through-connecting either the ringing signal or the display signal to the ring down line, the relay means being controllable by the central processing unit.

* * * * *